June 29, 1926.
J. ERDMAN
LAWN MOWER
Filed June 2, 1924
1,590,928
2 Sheets-Sheet 1
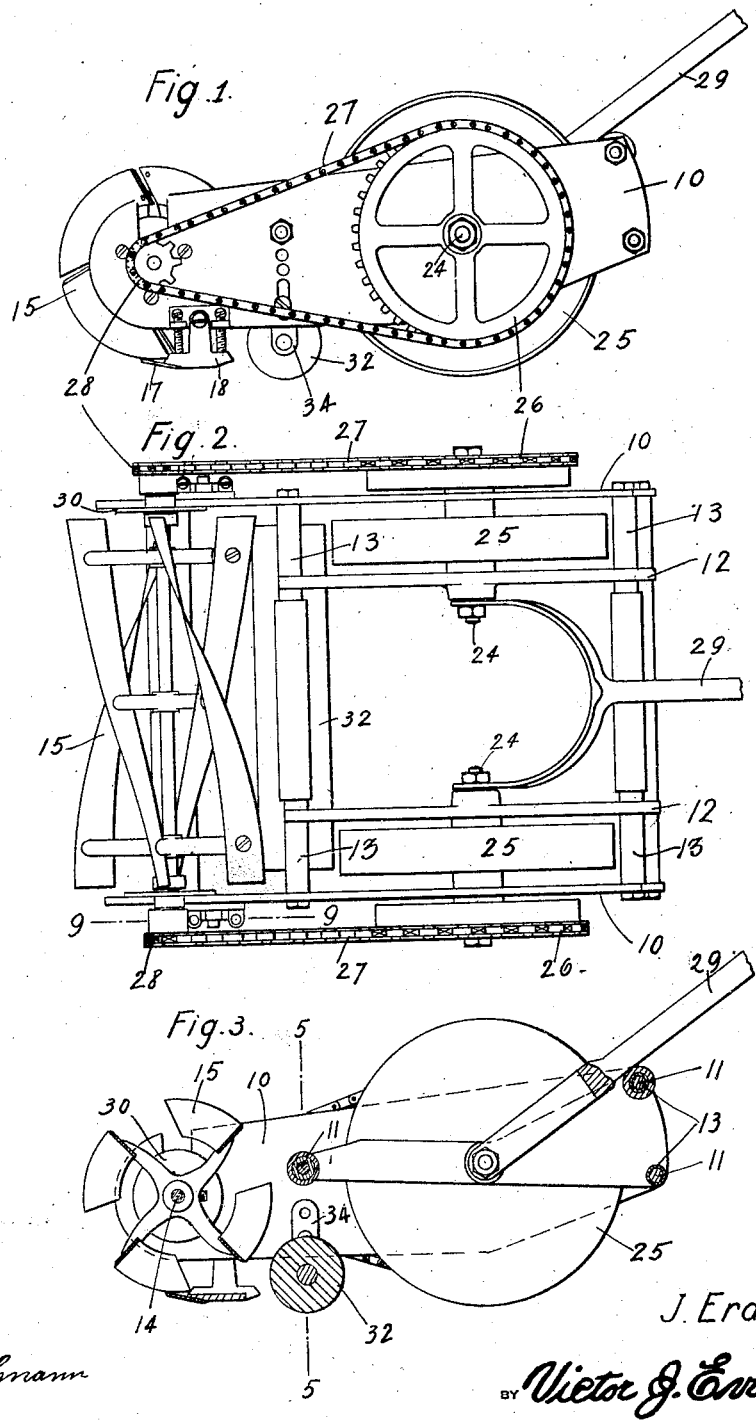
J. Erdman
INVENTOR June 29, 1926.
J. ERDMAN
LAWN MOWER
Filed June 2, 1924
1,590,928
2 Sheets-Sheet 2
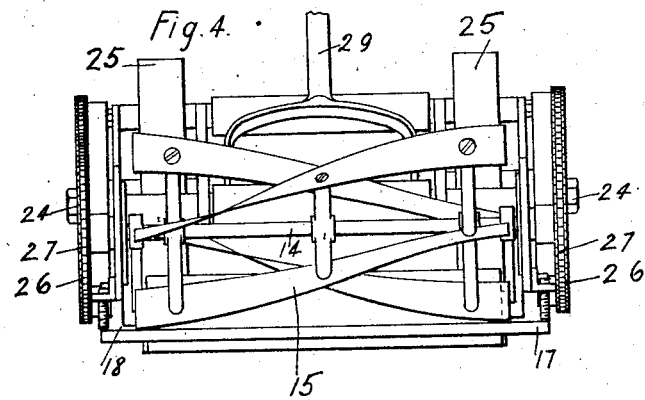
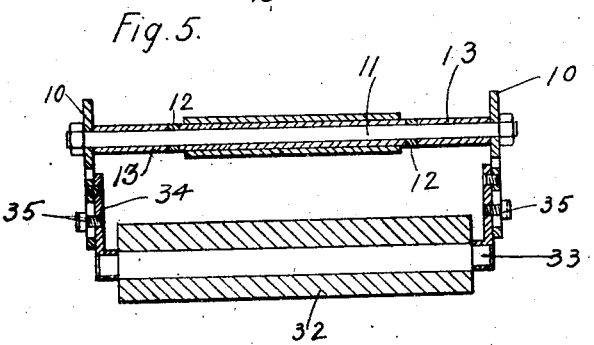
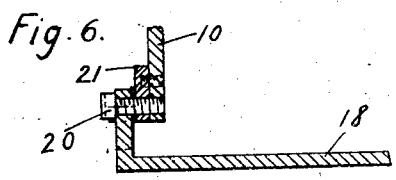
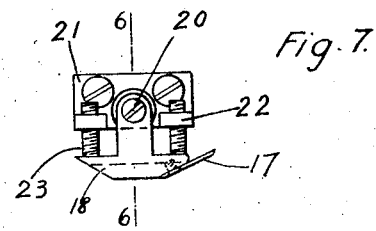
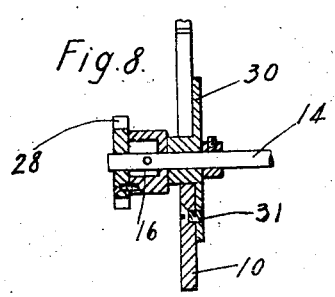
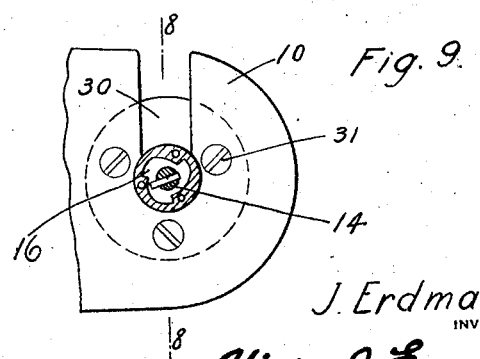
J. Erdman.
INVENTOR
BY Victor J. Evans
ATTORNEY Patented June 29, 1926.

1,590,928

UNITED STATES PATENT OFFICE.

JOHN ERDMAN, OF MILWAUKEE, WISCONSIN.

LAWN MOWER.

Application filed June 2, 1924. Serial No. 717,380.

This invention relates to improvements in lawn mowers, an object being to provide a mower wherein the traction wheels are located at the rear of the cutter in such position as not to roll over and mash down the grass previous to the passage of the cutter thereover.

Another object of the invention is the provision of a novel construction and arrangement of mower formation within which the traction wheels are mounted, the axles of said wheels providing convenient means for attaching the handle of the mower as well as the cutter operating mechanism.

Another object of the invention is the provision of novel means for mounting and adjusting the stationary cutter blade so that the latter may be quickly and accurately adjusted with respect to the rotary cutter.

With the above and other objects in view, the invention further includes the following novel features and details of construction, to be hereinafter more fully described, illustrated in the accompanying drawings and pointed out in the appended claim.

In the drawings:—

Figure 1 is a side elevation of a lawn mower constructed in accordance with the invention.

Figure 2 is a top plan view of the same.

Figure 3 is a vertical section taken substantially central of the mower.

Figure 4 is a front view of the mower.

Figure 5 is a section taken substantially on the line 5—5 of Figure 3.

Figure 6 is a fragmentary section on the line 6—6 of Figure 7.

Figure 7 is an end view illustrating the mounting and adjusting means for the stationary knife blade.

Figure 8 is a section on the line 8—8 of Figure 9.

Figure 9 is a fragmentary section on the line 9—9 of Figure 2.

Referring to the drawings in detail wherein like characters of reference denote corresponding parts, the mower is shown as comprising a frame which includes outer parallel plates 10 which are connected by spaced transversely arranged rods 11, while mounted upon these rods are relatively short plates 12 which are spaced inwardly from the plates 10. The plates 10 and 12 are held in proper spaced relation by means of spacing sleeves 13 which are mounted upon the rods 11.

Mounted in suitable bearings provided in the forward ends of the plates 10 is an axle or shaft 14 which carries radial cutter blades 15, the said blades being arranged between the plates 10 and in front of the forward ends of the plates 12. The cutter blades 15 are fast to the shaft 14 and when the mower is moved forward the shaft is rotated, but when the mower is moved in a reverse direction the shaft 14 is free. For this purpose there is provided a clutch mechanism 16 which is illustrated in Figure 9 of the drawings.

The blades 15 are designed to co-operate with the knife blade 17 and the latter is mounted upon a substantially U-shaped knife bar 18. The opposite ends of this bar are pivotally secured as shown at 20 to a block 21 which is secured to the plates 10 upon opposite sides of the machine. This block carries outwardly disposed apertured lugs 22 in which are threadedly mounted stop screws 23, the latter being adapted to engage the bar 18 upon opposite sides of the pivotal connection 20 so that the blade 17 may be readily and accurately adjusted with respect to the cutters 15.

Mounted in suitable bearings and extending through the plates 10 and 12 are spaced aligned axles 24 upon which are mounted traction wheels 25. These wheels as will be seen from Figure 2 of the drawings are located in the spaces provided between the plates 10 and 12 at the rear of and within the plane of the outer ends of the cutters 15 so that when the mower is in use these traction wheels will travel over grass which has already been cut and will not mash down the grass to one side of the mower and thus render difficult the cutting of this mashed down grass. Mounted upon the outer ends of the axles 25 are sprockets 26 over which pass chains 27. These chains also pass around sprockets 28 secured to the outer ends of the shaft 14 for the purpose of operating the rotary cutter 15. The inner ends of the shafts 24 have pivotally secured thereon the bifurcated ends of a handle 29.

The bearings for the shaft 14 are carried by plates or disks 30 which are secured by screws or bolts 31 to the plates 10, while the clutches 16 serve to connect the sprockets 28 and the shaft 14, as illustrated in Figure 8 of the drawings.

The forward end of the frame is supported by a roller 32 whose trunnions 33 are mounted in bearing plates 34 and the latter are adjustably secured to the plates 12 as shown at 35.

The invention is susceptible of various changes in its form, proportions and minor details of construction and the right is herein reserved to make such changes as properly fall within the scope of the appended claim.

Having described the invention what is claimed is:—

A lawn mower comprising a frame including spaced outer parallel side plates, an axle between said plates at the forward end of the frame, a rotary cutter mounted on said axle, sprockets upon the ends of said axles, a stationary blade adjustably mounted upon said plates, rods connecting the plates, relatively short plates spaced inwardly from the outer plates by the connecting rods, spaced sleeves on said rods between said plates, spaced aligned axles extending through the inner and outer plates, traction wheels mounted upon said axles between said inner and outer plates within the plane of the ends of the rotary cutter, sprockets mounted upon the outer ends of the aligned axles and chains connecting said last mentioned sprockets with the sprockets on the axle of the rotary cutter whereby the cutter may be operated through the propulsion of the traction wheels, a handle pivotally mounted upon the inner ends of the aligned axles, and a roller for supporting the forward end of the frame.

In testimony whereof I affix my signature.

JOHN ERDMAN.